(12) United States Patent
Case et al.

(10) Patent No.: US 11,788,171 B2
(45) Date of Patent: Oct. 17, 2023

(54) METHODS OF RECOVERING AN ELEMENTAL RARE EARTH METAL, AND METHODS OF FORMING A RARE EARTH METAL

(71) Applicant: Battelle Energy Alliance, LLC, Idaho Falls, ID (US)

(72) Inventors: Mary E. Case, Idaho Falls, ID (US); Robert V. Fox, Idaho Falls, ID (US); Donna L. Baek, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 168 days.

(21) Appl. No.: 17/249,283

(22) Filed: Feb. 25, 2021

(65) Prior Publication Data
US 2021/0292870 A1 Sep. 23, 2021

Related U.S. Application Data (60) Provisional application No. 62/991,774, filed on Mar. 19, 2020.

(51) Int. Cl.
*C25C 1/00* (2006.01)
*C22B 59/00* (2006.01)
(Continued)

(52) U.S. Cl.
CPC ............. *C22B 59/00* (2013.01); *C01F 17/10* (2020.01); *C25C 1/22* (2013.01); *C25C 3/00* (2013.01); *C25C 3/34* (2013.01); *C25D 3/665* (2013.01)

(58) Field of Classification Search
CPC . C22B 59/00; C01F 17/10; C25C 1/22; C25C 3/00; C25C 3/34; C25D 3/665
See application file for complete search history.

(56) References Cited

U.S. PATENT DOCUMENTS

| 4,680,055 A | 7/1987 | Sharma |
| 4,767,455 A | 8/1988 | Jourdan |

(Continued)

FOREIGN PATENT DOCUMENTS

| AU | 2010233484 B2 | 1/2016 |
| WO | 2017/096470 A1 | 6/2017 |

OTHER PUBLICATIONS

Bhatt et al., "Structural Characterization of a Lanthanum Bistriflimide Complex, La(N(SO2CF3)2)3(H2O)3, and an Investigation of La, Sm, and Eu Electrochemistry in a Room-Temperature Ionic Liquid, [Me3NnBu][N(SO2CF3)2]," Inorg. Chem., vol. 44, (2005), pp. 4934-1940.

(Continued)

*Primary Examiner* — Zulmariam Mendez
(74) *Attorney, Agent, or Firm* — TraskBritt

(57) ABSTRACT

A method of recovering an elemental rare earth metal comprises placing a rare earth-containing material comprising a rare earth metal in a reaction solution comprising a reducing agent and a non-aqueous solvent comprising an ionic liquid or a eutectic mixture, reducing the rare earth metal with the reducing agent to form a metallic rare earth metal and cations of the reducing agent, transferring the cations of the reducing agent from the reaction solution to an electrochemical cell through an ion exchange membrane, and reducing the cations of the reducing agent in the electrochemical cell. Related methods of forming an elemental rare earth metal, and related systems are disclosed.

28 Claims, 2 Drawing Sheets

(51) Int. Cl.
    *C25C 1/22* (2006.01)
    *C01F 17/10* (2020.01)
    *C25C 3/00* (2006.01)
    *C25C 3/34* (2006.01)
    *C25D 3/66* (2006.01)

(56) References Cited

U.S. PATENT DOCUMENTS

| | | | |
|---|---|---|---|
| 6,365,301 | B1 | 4/2002 | Michot et al. |
| 2004/0238352 | A1 | 12/2004 | Wu et al. |
| 2014/0099249 | A1 | 4/2014 | Massonne et al. |
| 2014/0374267 | A1 | 12/2014 | Monteiro et al. |
| 2019/0186031 | A1 | 6/2019 | Baek et al. |
| 2019/0316225 | A1* | 10/2019 | Li .................... B01D 11/028 |

OTHER PUBLICATIONS

Deng et al., "Li-Ion Batteries: Basics, Progress, and Challenges," Energy Science and Engineering, vol. 3, No. 5, (2015), pp. 385-418.

Glukhov et al., "Electrodeposition of Rare Earth Metals Y, Gd, Yb in Ionic Liquids," Russian Journal of Physical Chemistry A, vol. 84, No. 1, (2010), pp. 104-108.

Gupta et al., "Oxide Reduction Process in the Preparation of Rare-Earth Metals," Minerals and Metallurgical Processing, vol. 30, No. 1, (Feb. 2013), pp. 38-44.

Hirschhorn, "Commercial Production of Rare Earth Metals by Fused Salt Electrolysis," Journal of Metals, (Mar. 1968), pp. 19-22.

Matsumiya, "Chapter 6 Electrodeposition of Rare Earth Metal in Ionic Liquids," Springer-Verlag Berlin Heidelberg, (2016), pp. 117-153.

Rees et al., "Alkali Metal Reductions of Organic Molecules: Why Mediated Electron Transfer from Lithium Is Faster than Direct Reduction," J Am. Chem. Soc, vol. 130, (2008), pp. 12256-12257.

Sharma, "Neodymium Production Processes," Journal of Materials, (Feb. 1987), pp. 33-37.

Spedding et al., "Production of Pure Rare Earth Metals," Industrial and Eengineering Chemistry, vol. 44, No. 3, (Mar. 1952), pp. 553-556.

Spedding et al., "Production of Rare Earth Metals in Quantity Allows Testing of Physical Properties," Journal of Metals, (May 1954), pp. 504-510.

Spedding et al., "The Preparation of Rare Earth Metals," Photochemistry of Iodine Monochloride and Hydrogen, (Jun. 5, 1952), pp. 2783-2785.

Suppan et al., "Electroplating Dysprosium from IL-Based Solutions: A Promising Electrochemical Step to Produce Stronger High Performance Nd(Dy)-Fe-B Sintered Magnets," Journal of The Electrochemical Society, vol. 162, No. 8, (2015), pp. D382-D388.

* cited by examiner

$CH_3CH_2OSO_3^-$
(10)

FIG. 2

METHODS OF RECOVERING AN ELEMENTAL RARE EARTH METAL, AND METHODS OF FORMING A RARE EARTH METAL

CROSS-REFERENCE TO RELATED APPLICATION

This application claims the benefit under 35 U.S.C. § 119(e) of U.S. Provisional Patent Application Ser. No. 62/991,774, filed Mar. 19, 2020, titled METHODS OF RECOVERING AN ELEMENTAL RARE EARTH METAL, METHODS OF FORMING A RARE EARTH METAL, AND RELATED SYSTEMS, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to systems and methods for reducing metals, such as rare earth metals. More particularly, embodiments of the disclosure relate to methods of recovering rare earth metals from rare earth-containing materials with a reusable reducing agent, and to related systems.

BACKGROUND

Rare earth elements (REEs) are used in many household and industrial materials. For example, rare earth elements are used in phosphor powders of fluorescent lighting and light emitting diodes (LEDs), catalysts, magnets, electronic devices including computer memory, DVDs, illuminated screens of electronic devices (e.g., cathode ray tubes, plasma displays, etc.), rechargeable batteries, cellular phones, or other materials.

Unfortunately, the global supply of rare earth elements is limited. One potential source of rare earth elements is in recycled used devices and materials incorporating the rare earth elements, such as from used electronics, used rare earth magnets, or used phosphor fluorescent lamps.

Recovery of rare earth metals (e.g., elemental rare earth metals) from rare earth-containing materials is difficult because most rare earth-containing materials from which the rare earth metals are recovered are in highly stable compounds exhibiting relatively high melting points and a relatively high standard free energy of formation. By way of example, rare earth-containing materials from which rare earth metals are recovered include rare earth halide salts (e.g., rare earth chlorides), rare earth nitrates, rare earth triflates, rare earth carbonates, rare earth bistriflimides, or rare earth oxides. Thus, recovery of rare earth metals from rare earth-containing materials is energy intensive and requires several steps. For example, one method of rare earth metal recovery is the metallothermic reduction of rare earth element halide salts (e.g., rare earth element chloride and rare earth element fluoride salts). Metallothermic reduction of rare earth metals requires electropositive elements chemical reducing agents (reductants), such as Group IA or Group IIA metals (e.g., calcium, lithium, sodium, potassium) to reduce the rare earth element halide to an elemental rare earth metal and form a corresponding halide of the Group IA or Group IIA metal. However, high temperatures are required to liquefy the salt matrix of the rare earth-containing material and supply sufficient energy to the rare earth-containing material to overcome the activation energy barrier for breaking the stable bonds (e.g., metal-halide bonds and/or metal-oxygen double bonds) of the rare earth-containing material. In addition, the reducing agent in such processes often contaminates the recovered rare earth metal. Further, after the rare earth metal is recovered, the rare earth metal is typically subjected to a purification process involving exposing the rare earth metal to a high temperature refining process, requiring temperatures from about 1,400° C. to about 3,000° C.

Other methods of recovering rare earth metals include thermal reduction of rare earth oxides. For example, calcium, magnesium, or carbon may be used as the reductant at temperatures greater than about 1,000° C. using a reduction-distillation process. In thermal reduction of rare earth oxides, a rare earth fluoride is reduced by a reducing material (calcium, magnesium, carbon), resulting in the rare earth metal and a fluoride of the reducing material. However, such methods require temperatures greater than about 1,000° C.

Yet another method of recovering rare earth metals includes electrowinning of metals from a molten salt eutectic at temperatures between about 600° C. and about 1,200° C., in a technique referred to as fused salt electrolysis (FSE). However, FSE requires maintaining the molten salts at elevated temperatures. The molten salts are toxic and may be corrosive to the electrowinning apparatus. In addition, FSE may result in the formation of toxic hydrofluoric acid gas and toxic rare earth fluoride salts that build up in the molten salt bath and short circuit the electrolysis process.

BRIEF SUMMARY

Embodiments disclosed herein include methods of removing contaminants from a solution, and related systems. For example, in accordance with one embodiment, a method of recovering an elemental rare earth metal comprises placing a rare earth-containing material comprising a rare earth metal in a reaction solution comprising a reducing agent and a non-aqueous solvent comprising an ionic liquid, reducing the rare earth metal with the reducing agent to form a metallic rare earth metal and cations of the reducing agent, transferring the cations of the reducing agent from the reaction solution to an electrochemical cell through an ion exchange membrane, and reducing the cations of the reducing agent in the electrochemical cell.

Additional embodiments are directed to a system for recovering an elemental rare earth metal from a rare earth-containing material. The system comprises a reaction chamber including a reaction solution comprising a rare earth-containing material, a reducing agent, and a non-aqueous solvent comprising an ionic liquid, an electrochemical cell adjacent to the reaction chamber, the electrochemical cell comprising the non-aqueous solvent and an electrode configured to regenerate the reducing agent, and an ion exchange membrane between the reaction chamber and the electrochemical cell, the ion exchange membrane configured to selectively allow passage of cations of the reducing agent to pass from the reaction chamber to the electrochemical cell.

In accordance with additional embodiments of the disclosure, a method of forming an elemental rare earth metal comprises reducing a rare earth metal of a rare earth-containing material in a reaction chamber comprising a reaction solution including the rare earth-containing material, a reducing agent, and a non-aqueous solvent comprising an ionic liquid to form an elemental rare earth metal and cations of the reducing agent, and reducing the cations of the reducing agent to regenerate the reducing agent in an electrochemical cell isolated from the rare earth-containing material.

DETAILED DESCRIPTION

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, system, or method for recovering rare earth metals from a rare earth-containing material. Only those process acts and structures necessary to understand the embodiments of the disclosure are described in detail below. Additional acts to recover a rare earth metal from a rare earth-containing material may be performed by conventional techniques. Further, any drawings accompanying the present application are for illustrative purposes only and, thus, are not drawn to scale. Additionally, elements common between figures may retain the same numerical designation.

As used herein, an "elemental" material (e.g., "elemental metal," an "elemental element" of the Periodic Table) means and includes an element in an unoxidized state. Materials in their elemental form are not ions and exhibit a neutral charge.

According to embodiments described herein, one or more rare earth metals are recovered from a rare earth-containing material by direct reduction using a chemical reducing agent (also referred to herein as a "reducing agent"). The rare earth-containing material may comprise one or more of a rare earth salt, a rare earth oxide, a rare earth nitrate, a rare earth chloride, a rare earth triflate (trifluoromethanesulfanone), a rare earth carbonate, a rare earth bistriflimide, and a rare earth element complexed with a ligand (a rare earth-ligand complex). The reducing agent may comprise one or more Group IA elements of the Periodic Table, one or more Group IIA elements of the periodic table, lanthanum, or combinations thereof. In some embodiments, the reducing agent comprises lithium. The rare earth-containing material and the reducing agent may be dispersed in a reaction solution that further includes a non-aqueous solvent. The reaction solution may be maintained at a temperature less than about 300° C. In some embodiments, the non-aqueous solvent comprises an ionic liquid comprising a eutectic mixture and the reaction solution is maintained at a temperature greater than about 100° C. In other embodiments, the non-aqueous solvent comprises an ionic liquid and the reaction solution is maintained at a temperature less than about 100° C. (e.g., about room temperature). In some embodiments, the reaction solution further includes a viscosity-reducing material, such as a molecular solvent, a compressed gas, or both. In the reaction solution, the reducing agent may reduce the rare earth metals of the rare earth-containing material to form an elemental rare earth metal. In some embodiments, the reaction solution further includes at least one electron transfer mediator formulated to facilitate transfer of electrons between the reducing agent and the rare earth-containing material. The reduced rare earth metal may precipitate out of the reaction solution and be recovered as a substantially pure rare earth metal. The oxidized reducing agent may comprise a cation of the reducing agent. An electrochemical cell may be in operable communication with the reaction solution, which may be separated from the electrochemical cell by an ion exchange membrane. The ion exchange membrane may be formulated and configured to facilitate transfer of cations of the reducing agent therethrough and may be substantially impermeable to other components of the reaction solution (e.g., the elemental reducing agent, the rare earth-containing material, the reduced rare earth metal). The cations of the reducing agent may be reduced in the electrochemical cell to regenerate the reducing agent and form the reducing agent in the elemental form. The recovered reducing agent may be recycled back to the reaction solution, where it may be used to facilitate reduction of the rare earth metal of the rare earth-containing material. The non-aqueous solvent may be selected to be hydrophobic and formulated and configured to withstand reduction potentials of the reducing agent.

Figure 1:
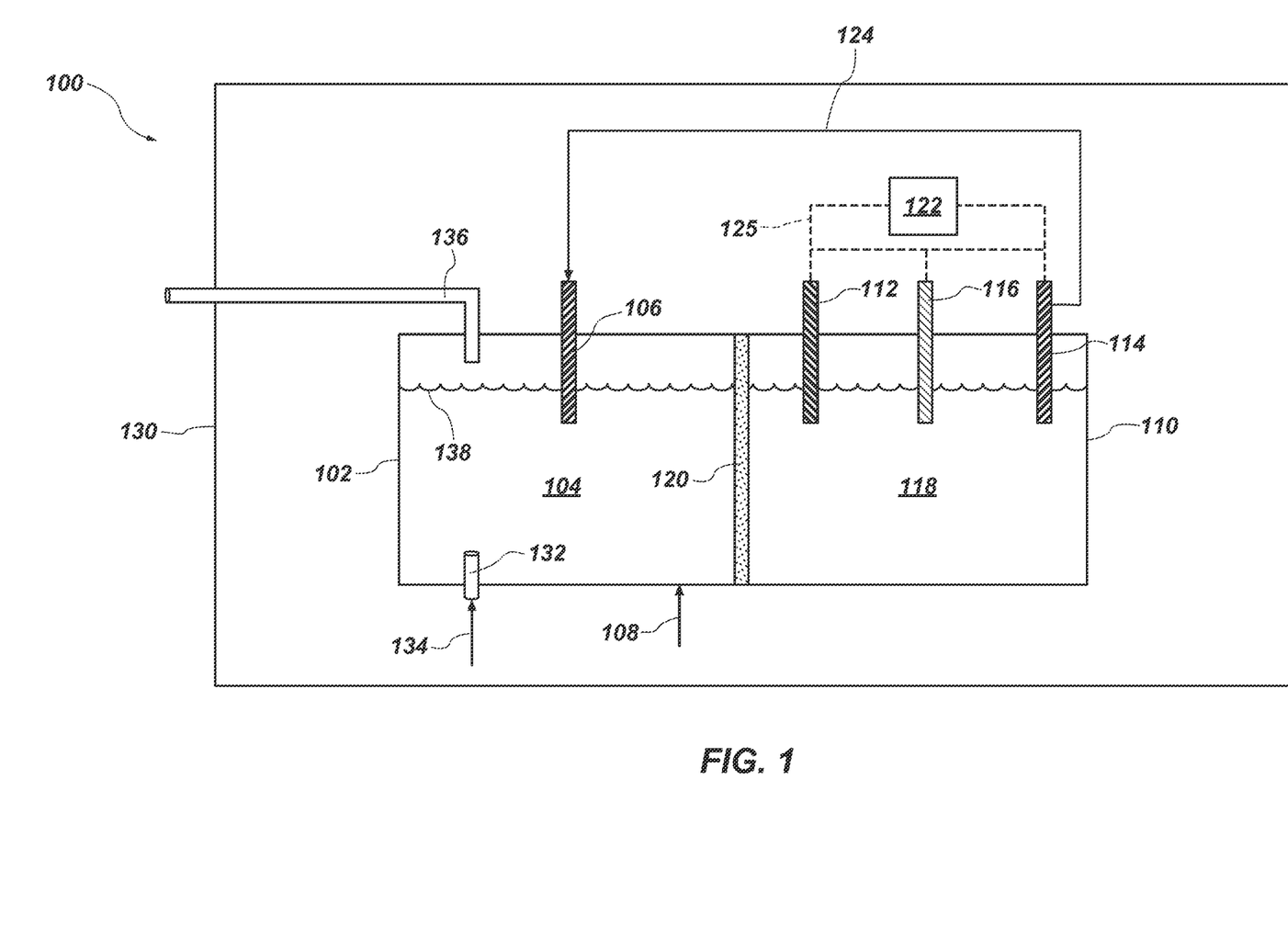
FIG. 1 is a simplified schematic illustration of a system for recovering one or more rare earth metals from a rare earth-containing material, in accordance with embodiments of the disclosure.

FIG. 1 is a simplified schematic of a system 100 for recovering one or more rare earth elements from a rare earth-containing material, in accordance with embodiments of the disclosure. The system 100 includes a reaction chamber 102, an electrochemical cell 110, and an ion exchange membrane 120 between the reaction chamber 102 and the electrochemical cell 110.

The reaction chamber 102 may include a reaction solution 104. The reaction solution 104 may be a hydrophobic, non-aqueous solution. The reaction solution 104 may include a non-aqueous solvent comprising an ionic liquid. The reaction solution 104 may further include a rare earth-containing material and a reducing agent. In some embodiments, the reaction solution 104 further comprises an electron transfer mediator, a viscosity-reducing material, or both.

The solvent may be formulated and configured to be substantially inert in the presence of the reducing agent and may be formulated to withstand the reducing potential of the reducing agent. In some embodiments, the reducing agent is provided to the reaction solution 104 by means of an electrode 106 comprising (e.g., formed at least partially from) the reducing agent. The reducing agent may solubilize in the reaction solution 104. Stated another way, the reducing agent may be soluble in the reaction solution 104. In other embodiments, the reducing agent is provided to the reaction solution 104 as a powder or in another form. In some embodiments, the rare earth-containing material may be provided to the reaction solution 104 via rare earth-containing material feed 108.

In some embodiments, the reaction solution 104 is maintained at a temperature less than about 300° C. In some embodiments, the reaction solution 104 is maintained at a temperature less than about 100° C. and the non-aqueous solvent comprises an ionic liquid. In some such embodiments, the reaction solution 104 may be maintained at about room temperature (e.g., from about 20° C. to about 25° C.). In some embodiments, the non-aqueous solvent comprises a eutectic mixture (e.g., an ionic liquid comprising a eutectic mixture) and the reaction solution 104 is maintained at a temperature greater than about 100° C. (e.g., from about 100° C. to about 300° C.).

In some embodiments, the reaction solution 104 is formed within the reaction chamber 102. In other embodiments, the reaction solution 104 is formed external to the reaction chamber 102 and provided to the reaction chamber 102 as a premixed solution (e.g., including the solvent, the rare earth-containing material, the reducing agent, and optionally, one or both of the electron transfer mediator and the viscosity-reducing material).

The rare earth-containing material may include a compound containing a rare earth element (REE) (such as a rare earth metal (REM)), such as one or more of neodymium (Nd), praseodymium (Pr), europium (Eu), dysprosium (Dy), samarium (Sm), holmium (Ho), scandium (Sc), yttrium (Y), lanthanum (La), cerium (Ce), promethium (Pm), gadolinium (Gd), terbium (Tb), erbium (Er), thulium (Tm), ytterbium (Yb), and lutetium (Lu).

The rare earth-containing material may be present in the reaction solution 104 at a concentration of at least about 0.5 weight percent, at least about 1.0 weight percent, at least about 2.0 weight percent, at least about 4.0 weight percent, at least about 6.0 weight percent, at least about 8.0 weight percent, at least about 10 weight percent, at least about 20 weight percent, at least about 30 weight percent, or at least about 50 weight percent. For example, the rare earth-containing material may constitute from about 0.5 weight percent to about 50 weight percent of the reaction solution 104, such as from about 0.5 weight percent to about 1.0 weight percent, from about 1.0 weight percent to about 2.0 weight percent, from about 2.0 weight percent to about 4.0 weight percent, from about 4.0 weight percent to about 6.0 weight percent, from about 6.0 weight percent to about 8.0 weight percent, from about 8.0 weight percent to about 10 weight percent, from about 10 weight percent to about 20 weight percent, from about 20 weight percent to about 30 weight percent, or from about 30 weight percent to about 50 weight percent of the reaction solution 104. In some embodiments, the reaction solution 104 may be formulated and configured to facilitate solubilization of at least about 10 weight percent of the rare earth-containing material.

The rare earth metal of the rare earth-containing material may be in an oxidized state and may exhibit an oxidation state of +1, +2, +3, or another oxidation state. In some embodiments, the rare earth metal of the rare earth-containing material is in the +3 oxidation state. The rare earth-containing material may include a metal oxide, a metal nitrate, a metal chloride, a metal triflate (e.g., trifluoromethanesulfonate), a metal carbonate, a metal bistriflimide, a metal-ligand complex, and an ionic-liquid-bound metal. For example, the rare earth-containing material may include rare earth metals as one or more of a rare earth metal-ligand complex, a rare earth metal salt (e.g., a rare earth fluoride, a rare earth chloride, a rare earth nitrate, a rare earth triflate, a rare earth carbonate, a rare earth bistriflimide), and a rare earth metal oxide.

In some embodiments, the rare earth-containing material comprises a rare earth metal-ligand complex. The rare earth metal-ligand complex may include one or more of N-, O-, P-, and S-donor ligands, such as one or more beta-diketones, carboxylic acids, tertiary amines, thiocarbomates, diglycolamides, organophosphates, and other ligands. Non-limiting examples of diglycolamides include one or more of N,N,N',N'-tetraoctyl diglycolamide (TODGA), N,N-di-2-ethylhexyl-N',N'-di-octyl diglycolamide (DEHDODGA), N,N,N',N'-tetra-2-ethylhexyl diglycolamide (TEHDGA), N,N-di-decyl-N',N'-di-hexyl diglycolamide (D(2)(DHDGA)), N,N-di-butyl-N',N'-di-dodecyl diglycolamide (DBD(3)(DGA)), N,N,N',N'-tetra-hexyl diglycolamide (THDGA), N,N,N',N'-tetradecyl diglycolamide (TDDGA), N,N,N',N'-tetradodecyl diglycolamide (TdDDGA), N,N,N',N'-tetraamyl-3-oxapatanediamide (TADGA), N,N,N',N'-tetrapropyl-3-oxapantanediamide (TPDGA), N,N,N',N'-tetramethyldiglycolamide (TMDGA), N,N,N',N'-tetraethyl diglycolamide (TEDGA), and N,N-dioctyldiglycolamic acid (DODGAA).

Non-limiting examples of organophosphates include one or more of liquid phosphine oxides (such as Cyanex 923 by Cytec Industries, Inc.), Cyanex 301, Cyanex 302, a dialkyl phosphinic acid extractant (such as Cyanex 272 by Cytec Industries, Inc.), other phosphorus-based chelating extractants (such as Cyanex 572 by Cytec Industries, Inc.), 2-ethylhexyl hydrogen 2-ethylhexyl phosphonate (PC88A), octyl (phenyl)N,N-diisobutylcarbamoylmethyl phosphine oxide (CMPO), tetraamyl methylenediphosphonate (TAMDP), dioctyl N,N-diethylcarbamylphosphonate (DODECP), dihexyl N,N-dibutylcarbamylmethylenephosphonate (DHDBCMP), bis(2,2,4-trimethyl-1-pentyl) phosphinic acid, di(2-ethylhexyl) phosphoric acid (D2EHPA), bis-isodecyl phosphoric acid (DP-8R), bis-isostearyl phosphoric acid (DP10-R), di-n-butyl phosphoric acid (DBPA), di-n-amyl phosphoric acid (DAPA), di-n-octyl phosphoric acid (DOPA), diisoamyl phosphoric acid (DIAPA), trioctylphosphine oxide (TOPO), tributylphosphine oxide (TBPO), triisobutylphosphine oxide (TiBPO), tris(2-ethylhexyl)phosphine oxide, and tributyl phosphate (TBP).

Non-limiting examples of amines include one or more of a tri-octyl/decyl amine (such as, for example, Alamine 336), trioctylamine, bis(2-ethylhexyl)amine, tris(2-ethylhexyl) amine, tripentylamine, tributylamine, triisobutylamine, N,N,N',N',N'',N''-hexaalkyl-nitrilotriacetamide (NTAamide), N,N,N',N'-tetraethyl-3,6-dioxacoctane diamine (DOODA (C2)), N,N,N',N'-tetraoctyl-3,6-dioxaoctane diamide (DOODA (C8)), and diethylenetriamine-N,N-N',N'',N''-pentaacetic acid (DTPA).

Non-limiting examples of other ligands include one or more of 2,2-dimethyl-6,6,7,7,8,8,8-heptafluoro-3,5-octanedione (FOD), hexafluoroacetylacetone (HFAA), thenoyltrifluoroacetone (TTA), bis(trifluoroethyl) dithiocarbamate, diethyldithiocarbamate, N,N'-dimethyl-N,N'-dioctylhexylethoxymalonamide (DMDOHEMA), and one or more (3-diketones.

In other embodiments, the rare earth-containing material comprises a rare earth oxide, such as one or more of yttrium oxide ($Y_2O_3$), lanthanum oxide ($La_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_2O_3$), gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), ytterbium oxide ($Yb_2O_3$), lutetium oxide ($Lu_2O_3$), scandium oxide ($Sc_2O_3$), and thulium oxide ($Tm_2O_3$).

In some embodiments, the rare earth-containing material comprises a rare earth salt, such as a rare earth halide. For example, the rare earth-containing material may comprise one or more of a rare earth halide, a rare earth dihalide, a rare earth trihalide (e.g., $LaX_3$, wherein X is fluorine, chlorine, bromine, or iodine), a rare earth tetrahalide, and a rare earth oxyhalide. In some embodiments, the rare earth-containing material comprises a rare earth trihalide.

Although the rare earth-containing material has been described as comprising various materials, the disclosure is not so limited and the rare earth metal may be present in forms other than those described above.

The ionic liquid may comprise exclusively or almost exclusively ions. The ionic liquid may include at least one cation electrostatically bound to an anion to form a salt that is liquid at a temperature of 20° C. Ionic liquids differ from so-called "molten salts" in that molten salts are typically corrosive and require extremely high temperatures to form a liquid due to ionic bond energies between ions in a salt lattice. For example, the melting temperature of face-centered cubic crystal sodium chloride is greater than 800° C. In comparison, many ionic liquids are in a liquid phase below 100° C., and may be referred to in the art as room-temperature ionic liquids (RTILs). In some embodiments, the ionic liquid of the reaction solution 104 may be in the liquid phase at temperatures below about 100° C. In other embodiments, the ionic liquid of the reaction solution 104 may comprise a liquid at a temperature from about 100° C. to about 300° C., such as from about 100° C. to about 150° C., from about 150° C. to about 200° C., from about 200° C. to about 250° C., or from about 250° C. to about 300° C.

Figure 2:
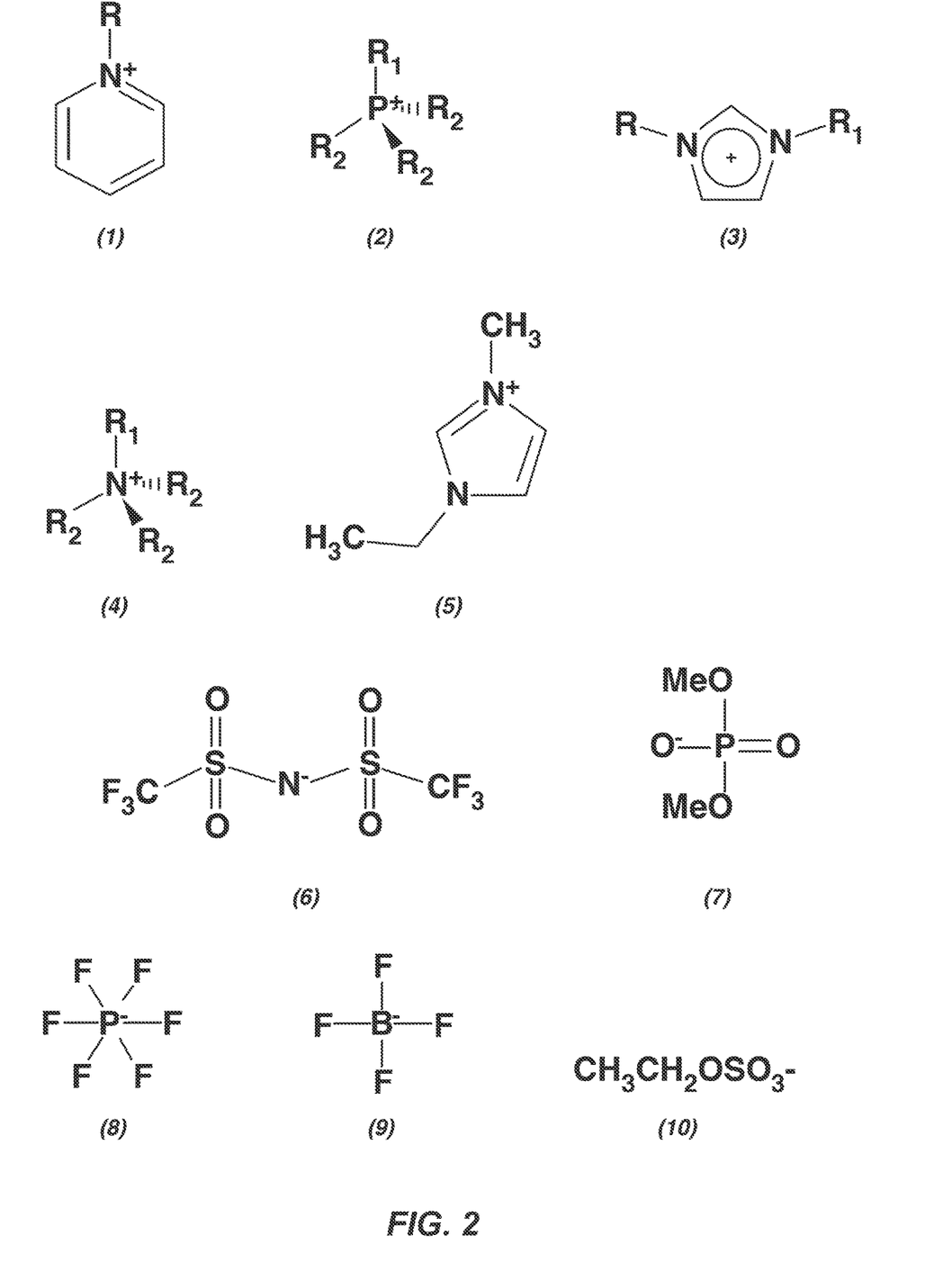
FIG. 2 shows the chemical formulas of example cations and anions that may be used in ionic liquids, in accordance with embodiments of the disclosure.

In some embodiments, an ionic liquid may include a cation having any of formulas (1) through (5), shown in FIG. 2, and an anion having any of formulas (6) through (10) of FIG. 2. In the structures shown in FIG. 2, R, $R_1$, and $R_2$, may be hydrogen, hydrocarbon groups (e.g., alkyl groups, cycloalkyl groups, alkynyl groups, aryl groups, etc.) or substituted hydrocarbon groups. Some ionic liquids are described in U.S. Pat. No. 6,365,301 "Materials Useful as Electrolytic Solutes," granted on Apr. 2, 2002, the entire disclosure of which is hereby incorporated herein by this reference. In some embodiments, the ionic liquid may include one or more of pyrrolidiniums (e.g., N-ethyl-N-methylpyrrolidinium, N-methyl-N-propylpyrrolidinium, N-methyl-N-isopropylpyrrolidinium, N-butyl-N-methylpyrrolidinium, N-isobutyl-N-methylpyrrolidinium, N-secbutyl-N-methylpyrrolidinium, N-methyl-N-pentylpyrrolidinium, N-hexyl-N-methylpyrrolidinium, N-heptyl-N-methylpyrrolidinium, N-methyl-N-octylpyrrolidinium, 1-n-butyl-1-methylpyrrolidinium bis(trifluoromethylsulfonyl)amide, etc.), piperidiniums, (e.g., N-methyl-N-propylpiperidinium, N-butyl-N-ethyl-piperidinium, N-ethyl-N-octylpiperidinium, etc.), tetra alkyl ammoniums (e.g., N-trimethylbutylammonium, N-hexyltriethylammonium, tetrabutylammonium, trimethyl-N-hexylammonium, dimethylethylphenylammonium, triethylmethylammonium, etc.), phosphoniums (e.g., trihexyl(tetradecyl)phosphonium, tetradecyl(trioctyl)phosphonium, triethyl-pentyl-phosphonium, triethyl-octyl-phosphonium, triethyl-dodecyl-phosphonium, trihexyl(tetradecyl)phosphonium dicyanamide, trihexyl(tetradecyl)phosphinium bis(trifluoromethylsulfonyl) amide, trihexyl(tetradecyl)phosphinium bis(2,4,4-trimethylpentyl phosphinate), trihexyl(tetradecyl)phosphinium bromide, trihexyl(tetradecyl)phosphinium chloride, trihexyl (tetradecyl)phosphinium decanoate, etc.), bis(trifluoromethanesulfonyl)imide, trifluoromethanesulfonate, dicyanimide, methyltributylammonium bis(trifluoromethylsulfonyl) imide, imidazolium chlorides (e.g., 1-ethyl-3-methylimidazolium chloride), tricaprylmethylammonium thiocyanate, and n-butylpyridinium chloride.

In some embodiments, ionic liquid of the reaction solution 104 comprises a deep eutectic mixture (also referred to herein as a "eutectic mixture" or a "eutectic material"). In some such embodiments, a temperature of the reaction solution 104 may be greater than about 100° C., such as from about 100° C. to about 300° C. The deep eutectic material may exhibit a higher melting point than ionic liquids. In some embodiments, the higher melting point of the deep eutectic mixture may substantially reduce or prevent reduction of water in the reaction solution 104 or contamination of the reaction solution 104 by water since any water present may be separated from the reaction solution 104 by means of vaporization. Removing water from the reaction solution 104 may reduce or eliminate side reactions within the reaction solution 104 between water and one or more components of the reaction solution 104 or the reduction of water to from hydroxide and hydrogen gas. In addition, increasing the temperature of the reaction solution 104 may facilitate improved reaction kinetics, according to the Arrhenius equation.

The deep eutectic mixture may include one or more of mixtures of choline ($C_5H_{14}NO$) bromide and xylitol ($C_5H_{12}O_5$), mixtures of choline and urea ($CH_4N_2O$), and mixtures of choline chloride ($[(CH_3)_3NCH_2CHOH]Cl$; $C_5H_{14}ClNO$) and lactic acid ($C_3H_6O_3$).

In some embodiments, the non-aqueous solvent of the reaction solution 104 further comprises a viscosity-reducing material. In some such embodiments, the non-aqueous solvent comprises the viscosity-reducing material and at least one of the ionic liquid and the deep eutectic material. In some embodiments, the viscosity-reducing material comprises a liquid. In other embodiments, the viscosity-reducing material comprises a gas. The viscosity-reducing material may reduce the viscosity of the reaction solution 104 (e.g., the ionic liquid).

The viscosity-reducing material constitutes within a range from about 0.1 weight percent to about 99.9 weight percent of the reaction solution 104 based on the total weight of the non-aqueous solvent and the viscosity-reducing material (and not including the weight of the reducing agent, the rare earth-containing material, and the electron transfer mediator). For example, the viscosity-reducing material may constitute from about 0.1 weight percent to about 0.5 weight percent, from about 0.5 weight percent to about 1.0 weight percent, from about 1.0 weight percent to about 5.0 weight percent, from about 5.0 weight percent to about 10.0 weight percent, from about 10.0 weight percent to about 20.0 weight percent, from about 20.0 weight percent to about 40.0 weight percent, from about 40.0 weight percent to about 60.0 weight percent, from about 60.0 weight percent to about 80.0 weight percent, or from about 80.0 weight percent to about 09.9 weight percent of the reaction solution 104 based on the total weight of the non-aqueous solvent and the viscosity-reducing material.

In some embodiments, the viscosity-reducing material comprises one or more molecular solvents. The molecular solvent may include one or more of acetone ($(CH_3)_2CO$), acetonitrile ($CH_3CN$), acetophenone ($C_8H_8O$), one or more alkyl carbonates (carbonate esters, organocarbonates, such as dimethyl carbonate, diethyl carbonate ($OC(OCH_3)_2$)

(DMC), diphenyl carbonate ($(C_6H_2O)_2CO$)), amyl alcohol ($C_5H_{12}O$), aniline ($C_6H_5NH_2$), benzene ($C_6H_6$), 1-butanol ($C_4H_{10}O$), 2-butanol ($C_4H_{10}O$), 2-butanone ($C_4H_5O$), t-butyl alcohol (($CH_3)_3COH$), butyl acetate ($C_6H_{12}O_2$), carbon tetrachloride ($CCl_4$), chlorobenzene ($C_6H_5Cl$), chloroform ($CHCl_3$), cyclohexane ($C_6H_{12}$), cyclohexanone ($C_6H_{10}O$), cyclohexanol ($C_6H_{11}OH$), 1,2-dichloromethane ($CH_2Cl_2$), diethylene glycol ($C_4H_{10}O_3$), dibutyl ether ($C_8H_{19}O$), dibutyl ketone ($C_9H_{18}O$), diethyl ether (($C_2H_5)_2O$), diisopropyl ether ($C_6H_{14}O$), diglyme (diethylene glycol dimethyl ether) ($C_6H_{14}O_3$), 1,2-dimethoxy-ethane (glyme, DME) ($C_4H_{10}O_2$), dimethyl-formanide (DMF) ($C_3H_7NO$), dimethyl sulfoxide (DMSO) ($C_2H_6OS$), 1,4-dioxane ($C_4H_8O_2$), ethanol ($C_2H_5OH$), ethanediol ($C_2H_6O_2$), ethyl acetate ($C_4H_8O_2$), ethylbenzene ($C_8H_{10}$), ethylene glycol ($C_2H_6O_2$), furfuraldehyde ($C_5H_4O_2$), glycerin ($C_3H_8O_3$), heptane ($C_7H_{16}$), hexamethylphosphoramide (HMPA) ($C_6H_{18}N_3OP$), hexamethylphosphorous triamide (P[N($CH_3)_2]_3$), hexane ($C_6H_{14}$), isopropyl acetate ($C_5H_{10}O_2$), isopropanol ($C_3H_8O$), methanol ($CH_3OH$), methyl acetate ($C_3H_6O_2$), methyl t-butyl ether (MTBE) ($C_5H_{12}O$), methyl ethyl ketone ($C_4H_8O$), methyl isobutyl ketone ($C_6H_{12}O$), methylene chloride ($CH_2Cl_2$), N-methyl-2-pyrrolidinone (NMP) ($C_5H_9NO$), morpholine ($C_4H_9NO$), nitromethane ($CH_3NO_2$), nitrobenzene ($C_6H_5NO_2$), nonane ($C_9H_2O$), octane ($C_8H_{18}$), octanol ($C_8H_{18}O$), pentane ($C_5H_{12}$), petroleum ether, phenol ($C_6H_6O$), 1-propanol ($C_3H_8O$), 2-propanol ($C_3H_8O$), propanediol ($C_3H_8O_2$), pyridine ($C_5H_5N$), sulfolane ($C_4H_8O_2S$), tetraethylene glycol dimethyl ether (TEGDME) ($C_{10}H_{22}O_5$), tetrahydrofuran ($C_4H_8O$), toluene ($C_7H_8$), trimethylamine ($C_3H_9O$), o-xylene ($C_8H_{10}$), m-xylene ($C_8H_{10}$), and p-xylene ($C_8H_{10}$).

In other embodiments, the viscosity-reducing material of the reaction solution 104 comprises a gas, such as a compressed gas. By way of non-limiting example, the viscosity-reducing material may include one or more of carbon dioxide ($CO_2$), nitrogen ($N_2$), ammonia ($NH_3$), helium (He), argon (Ar), one or more light hydrocarbon gases (e.g., one or more of methane ($CH_4$), ethane ($C_2H_6$), propane ($C_3H_8$), butane ($C_4H_{10}$)), one or more perfluorocarbons, and one or more hydrofluorocarbons. In some embodiments, the viscosity-reducing material comprises a mixture of one or more gases. By way of non-limiting example, the viscosity-reducing material may include a non-flammable mixture of carbon dioxide and one or more light hydrocarbon gases (e.g., a mixture of carbon dioxide and propane).

In some embodiments, such as where the viscosity-reducing material comprises a gas, the viscosity-reducing material may be provided to the reaction chamber 102 via an inlet 132, as indicated at arrow 134. In embodiments where the viscosity-reducing material comprises a gas, the viscosity-reducing material may facilitate removal of reaction byproducts and decomposition products of components of the reaction solution 104 (e.g., decomposition products of the ionic liquid) from the reaction chamber 102. In some embodiments, the reaction chamber 102 includes an outlet 136 through which the viscosity-reducing material may be removed from the reaction chamber 102. In some embodiments, the outlet 136 is located vertically above a liquid level 138 of the reaction solution 104.

In some embodiments, the gas may be introduced to the reaction solution 104 at a pressure within a range from atmospheric pressure to about 51.7 MPa (about 7,500 pounds per square inch (psi)), such as from about atmospheric pressure to about 1.0 MPa, from about 1.0 MPa to about 5.0 MPa, from about 5.0 MPa to about 10.0 MPa, from about 10.0 MPa to about 20.0 MPa, from about 20.0 MPa to about 40.0 MPa, or from about 40.0 MPa to about 51.7 MPa.

In some embodiments, the viscosity-reducing material facilitates removal of impurities from the reaction solution 104. By way of non-limiting example, the viscosity-reducing agent may facilitate removal of unwanted reaction byproducts of one or more components of the reaction solution 104, such as decomposed ionic liquids or non-aqueous solvents. The viscosity-reducing material may facilitate removal of short-chain carboxylic acids (e.g., acetate, oxalate) acetone, hydroxylated butoxy, or other material. In some embodiments, the viscosity-reducing material may carry the one or more contaminants out of the reaction chamber 102 through the outlet 136.

The reducing agent may include at least one of one or more Group IA elements of the Periodic Table, one or more Group IIA elements of the Periodic Table, and lanthanum. The one or more Group IA and Group IIA elements and lanthanum may be in elemental form. For example, the reducing agent may include one or more of elemental lithium, elemental sodium, elemental potassium, elemental rubidium, elemental cesium, elemental beryllium, elemental magnesium, elemental calcium, elemental strontium, elemental barium, and elemental lanthanum. In some embodiments, the reducing agent comprises one or more of lithium, sodium, potassium, magnesium, calcium, and lanthanum. In some embodiments, the reducing agent comprises elemental lithium.

The reducing agent may be present in the reaction solution 104 from a range from about 0.02 weight percent to about 50.0 weight percent of the reaction solution 104, such as from about 0.02 weight percent to about 0.10 weight percent, from about 0.10 weight percent to about 0.50 weight percent, from about 0.50 weight percent to about 1.0 weight percent, from about 1.0 weight percent to about 2.0 weight percent, from about 2.0 weight percent to about 4.0 weight percent, from about 4.0 weight percent to about 10.0 weight percent, from about 10.0 weight percent to about 20.0 weight percent, from about 20.0 weight percent to about 30.0 weight percent, or from about 30.0 weight percent to about 50.0 weight percent, based on a total mass of reaction solution 104 (e.g., a sum total mass of the rare earth-containing material, the reducing agent, the solvent, the viscosity-reducing material (if present), and the electron transfer mediator (if present)). In some embodiments, the reducing agent constitutes from about 2.0 weight percent to about 10.0 weight percent of the reaction solution 104.

The reaction solution 104 may include a mixture of the ionic liquid (or the deep eutectic material), the reducing agent, the rare earth-containing material, the viscosity-reducing material, and the electron transfer mediator. The ionic liquid may constitute from about 0.1 weight percent to about 99.9 weight percent of the reaction solution 104, such as from about 0.1 weight percent to about 0.5 weight percent, from about 0.5 weight percent to about 1.0 weight percent, from about 1.0 weight percent to about 5.0 weight percent, from about 5.0 weight percent to about 10.0 weight percent, from about 10.0 weight percent to about 20.0 weight percent, from about 20.0 weight percent to about 40.0 weight percent, from about 40.0 weight percent to about 60.0 weight percent, from about 60.0 weight percent to about 80.0 weight percent, from about 80.0 weight percent to about 90.0 weight percent, from about 90.0 weight percent to about 95.0 weight percent, from about 95.0 weight percent to about 99.0 weight percent, from about 99.0 weight percent to about 99.5 weight percent, or from about 99.5 weight percent to about 99.9 weight percent of the reaction solution 104 based on a total weight of the ionic liquid and the viscosity-reducing material (e.g., the molecular solvent).

In some embodiments, the reaction solution 104 may comprise a binary, ternary, or multinary mixture of one or more of the ionic liquids and one or more of the viscosity-reducing materials (e.g., one or more of the molecular solvents). By way of non-limiting example, the reaction solution may include a mixture of two or more ionic liquids (e.g., a binary mixture of ionic liquids), a mixture of three or more ionic liquids (e.g., a ternary mixture of ionic liquids), a mixture of four or more ionic liquids, or a mixture of a greater number of ionic liquids. In addition, the reaction solution 104 may include mixture of two or more viscosity-reducing materials (e.g., a binary mixture of viscosity-reducing materials), a mixture of three or more viscosity-reducing materials (e.g., a ternary mixture of viscosity-reducing materials), a mixture of four or more viscosity-reducing materials, or a mixture of a greater number of viscosity-reducing materials.

In some embodiments, the reaction chamber 102 is operated in batch mode and the reaction solution 104 comprising the rare earth-containing material, the reducing agent, and the non-aqueous solvent is formed (e.g., premixed) and provided to the reaction chamber 102. In some embodiments, the reaction solution 104 may remain in the reaction chamber 102 for a duration from about 1 hour to about 24 hours without replacing the reducing agent (e.g., the electrode 106), such as from about 1 hour to about 4 hours, from about 4 hours to about 8 hours, from about 8 hours to about 12 hours, from about 12 hours to about 18 hours, or from about 18 hours to about 24 hours. However, the disclosure is not so limited. In other embodiments, the reaction chamber 102 is operated continuously and the rare earth-containing material and the reducing agent are provided to the reaction chamber 102 continuously.

In use and operation, the reducing agent reacts with the rare earth-containing material in the reaction solution 104 to directly reduce the rare earth metal of the rare earth-containing material and form an elemental rare earth metal or a rare earth metal alloy comprising unoxidized rare earth metals. For example, the reducing agent may facilitate direct reduction of the rare earth metal of the rare earth-containing material to form an elemental rare earth metal (e.g., $M^{3+}+3e^- \rightarrow M$, wherein M is a rare earth metal in a non-oxidized state (with a 0 valence)). The reduced rare earth metal may precipitate out of the reaction solution 104. The electrons for reduction of the rare earth metal may be provided directly by the reducing agent (e.g., $3\ Li \rightarrow 3\ Li^+ + 3\ e^-$). The overall reaction of the reduction of the rare earth metal may be represented according to the following equation: $M^{3+}+3\ Li(s) \rightarrow 3\ Li^+ + M\ (s)$.

The electron transfer mediator (also referred to as an "electron mediator") may be formulated to facilitate transfer of electrons from the reducing agent to the rare earth-containing material. The electron transfer mediator may include a compound that receives electrons from the reducing agent to create a charged species that, in turn, reacts with the rare earth metal of the rare earth-containing material to reduce the rare earth-containing material and form a rare earth metal. In some embodiments, the electron transfer mediator facilitates increasing the kinetic reaction rate of the reduction of the rare earth-containing material to form the rare earth metal. By way of non-limiting example, the electron transfer mediator may comprise one or more of 7,7,8,8-tetracyanoquinodimethane containing-compounds (salts), lithium tetrakis(pentafluorophenyl) borate, decamethylruthenocene, tetrabutylammonium, bis(triphenylephosphoranylidene) ammonium chloride, bis(triphenylephosphoranylidene) ammonium tetrakis (pentafluorophenyl) borate, graphene oxide (e.g., pyrolytic graphite, such as highly ordered pyrolytic graphite), hydroxyl radicals, carbon radicals, ionic liquids such as 1-butyl-3-methylimidazolium tetrafluoroborate (BMIM-BF4), divalent lanthanide derivatives (e.g., samarium iodide), rhodium ions, lithium metal (e.g., elemental lithium), calcium metal (e.g., elemental calcium), sodium metal (e.g., elemental sodium), potassium metal (e.g., elemental potassium), and magnesium metal (e.g., elemental magnesium).

In some embodiments, the rare earth metal may precipitate on a substrate material, a Group IA material, a Group IIA material, lanthanum, or on a material comprising the rare earth metal. In some embodiments, the rare earth metals precipitate out of the reaction solution 104 and forms a nucleation site, upon which additional precipitated rare earth metals may precipitate. In embodiments where the rare earth metals precipitate on a Group IA, Group IIA material, or lanthanum, the rare earth metal may be separated from the Group IA material, the Group IIA material, or the lanthanum by, for example, placing the respective one of the Group IA material, the Group IIA material, or the lanthanum and the rare earth metal in a furnace in a reducing environment to vaporize the Group IA material, the Group IIA material, or the lanthanum while the rare earth metal remains in solid form.

As the reduction of the rare earth metal proceeds, the reducing agent is consumed and is oxidized. Oxidation of the reducing agent changes the reducing agent from elemental form and generates cations of the reducing agent in the reaction solution 104. Concurrently therewith, the rare earth metal of the rare earth-containing material is reduced by the reducing agent and changes from cationic form to elemental (metallic) form. Accordingly, in some embodiments, reduction of the rare earth element may consume (e.g., reduce a concentration) of the reducing agent in the reaction solution 104.

In some embodiments, the spent reducing agent (cations of the reducing agent) may be converted back to elemental form to facilitate further reduction of the rare earth metals of the rare earth-containing materials with the reducing agent. The ion exchange membrane 120 may be formulated and configured to facilitate selective transfer of cations of the reducing agent from the reaction chamber 102 to the electrochemical cell 110. The ion exchange membrane 120 may comprise a cation exchange membrane. In some embodiments, the ion exchange membrane 120 is configured selectively transfer the cations of the reducing agent from the reaction chamber 102 to the electrochemical cell 110 and may be substantially impermeable to other materials (e.g., cations of the rare earth material, the elemental rare earth metal, the elemental reducing agent, other components of the reaction solution 104). In some embodiments, the ion exchange membrane 120 is permeable to a portion of the non-aqueous solvent.

By way of non-limiting example, the ion exchange membrane 120 may comprise a membrane comprising tetrafluoroethylene based fluoropolymer-copolymer materials (e.g., sulfonated tetrafluoroethylene based fluoropolymer-copolymer), poly(ethylene oxide) (PEO), membranes plasticized with tetraethylene glycol dimethyl ether (TEGDME), a monovalent cation exchange membrane (PC-MVK), or other materials. In some embodiments, the ion exchange membrane comprises a Nafion® ion exchange membrane, commercially available from the Chemours Company of Wilmington, Del.

The electrochemical cell 110 may be configured to reduce the cations of the reducing agent and regenerate the elemental reducing agent. The electrochemical cell 110 may include, an anode 112, a cathode 114, and a reference electrode 116 disposed within an electrolyte 118.

The electrolyte 118 may comprise cations of the reducing agent and the solvent of the reaction solution 104. In some embodiments, the electrolyte 118 comprises the non-aqueous solvent (e.g., the ionic liquid or the eutectic material), the viscosity-reducing material, and the cations of the reducing agent. The viscosity-reducing material may reduce the viscosity of the electrolyte 118 and may facilitate removal of contaminants from the electrolyte 118.

The anode 112, the cathode 114, and the reference electrode 116 may be coupled to a potentiostat 122. The potentiostat 122 may be configured to measure and/or provide an electric potential between the anode 112 and the cathode 114. The difference between the electric potential of the anode 112 and the cathode 114 may be referred to as a "cell potential" of the electrochemical cell 110. The anode 112, the cathode 114, and the reference electrode 116 may be in electrical communication, as indicated by broken line 125.

The reference electrode 116 may be in electrical communication with the anode 112 and the cathode 114 and may be configured to monitor a potential difference between the anode 112 and the cathode 114. Accordingly, the reference electrode 116 may be configured to monitor the cell potential of the electrochemical cell 110. The reference electrode 116 may include one or more of nickel, nickel/nickel oxide, glassy carbon, silver/silver chloride, one or more platinum group metals, and one or more precious metals (e.g., gold).

The anode 112 may include one or more of nickel, nickel/nickel oxide, glassy carbon, silver/silver chloride, one or more platinum group metals, one or more precious metals (e.g., gold), aluminum, carbon, nickel cobalt aluminum (NCA), nickel cobalt manganese (NCM), copper, iron, or other materials. In some embodiments, the anode 112 comprises platinum. However, the disclosure is not so limited and the anode 112 may comprise materials other than those described above.

The cathode 114 may include a Group IA material, a Group IIA material, copper, a precious metal, a platinum group metal (e.g., platinum, osmium, iridium, ruthenium, rhodium, palladium), iron, carbon (e.g., glassy carbon), or another material. In some embodiments, the cathode 114 comprises the same element as the reducing agent. For example, where the reducing agent comprises lithium, the cathode 114 may comprise lithium.

In use and operation, an electric potential is applied between the anode 112 and the cathode 114. Responsive to the electric potential, cations in the electrolyte 118 move to the cathode 114, where the cations are reduced to elemental form to regenerate the reducing agent. As only one example, where the reducing agent comprises lithium, the cations in the electrolyte 118 may include lithium ions (Li$^+$), which may be reduced at the cathode 114 according to the following reaction:

By way of non-limiting example, the electric potential between the anode 112 and the cathode 114 may be from about 0.5 V to about 5.0 V, such as from about 0.5 V to about 1.0 V, from about 1.0 V to about 2.0 V, from about 2.0 V to about 3.0 V, from about 3.0 V to about 4.0 V, or from about 4.0 V to about 5.0 V. However, the disclosure is not so limited and the electric potential between the anode 112 and the cathode 114 may be different than those described above depending upon, among other things, the composition of the reference electrode 116, the composition of the anode 112, the composition of the cathode 114, and the composition of the electrolyte 118.

The reducing agent may be deposited (e.g., plated) onto the cathode 114 in elemental form during operation of the electrochemical cell 110. As indicated at arrow 124, the elemental reducing agent may be recycled back to the reaction chamber 102, where it is introduced into the reaction solution 104 to facilitate reduction of the rare earth material from the rare earth-containing material, as discussed above. In some embodiments, when the electrode 106 comprising the reducing agent is consumed, the electrode 106 is removed from the reaction chamber 102 and placed into the electrochemical cell 110, where it may become a cathode (e.g., cathode 114) to be regenerated to the elemental reducing agent. The cathode 114 from the electrochemical cell 110 may be placed in the reaction chamber 102 to provide the reducing agent to the reaction solution 104.

In some embodiments, the reaction chamber 102 and the electrochemical cell 110 may be located within a chamber 130, which may comprise, for example, a glove box. In some embodiments, the chamber 130 may be free of oxygen and may comprise an inert atmosphere (e.g., nitrogen, argon, etc.).

In some embodiments, the reaction chamber 102 and the electrochemical cell 110 may be maintained under an inert atmosphere with a so-called "inerting" oil, which may include, for example, mineral oil or silicon oil. The inerting oil may be used to reduce atmospheric water and oxygen contacting the system 100.

Reducing the rare earth metals of the rare earth-containing material in a reaction solution 104 comprising a hydrophobic media may facilitate improved recovery of the rare earth metals. By way of comparison, reduction of rare earth metals in an aqueous solution may be hindered by water. For example, water may be preferentially reduced relative to the rare earth metals in the reaction solution 104. Reduction of rare earth metals (e.g., Ho$^{3+}$+3e$^-$→Ho) requires a standard electrode potential (E$^0$) having a significantly higher magnitude than the standard electrode potential for the reduction of water (2H$_2$O (l)+2e--→H$_2$ (g)+2 OH$^-$ (aq)), which has a standard electrode potential of about −0.8277 V. The reduction of holmium ions to elemental holmium requires a standard electrode potential of about −2.77 V. Without wishing to be bound by any theory, it is believed that since water may be reacted to hydrogen gas and hydroxide ions at a standard electrode potential having a lower magnitude than the reduction of rare earth metals, water short circuits the reduction of the rare earth metals and hinders the reaction, since water preferentially reacts prior to the reducing agent and the rare earth-containing material. Further, hydrogen gas that may evolve from aqueous solutions is explosive and hazardous.

In addition, the methods described herein facilitate reduction of rare earth metals using less energy and lower temperatures, emit less pollution, and are less hazardous than conventional methods of reducing rare earth metals from rare earth-containing materials. For example, the methods described herein do not form hydrogen fluoride gas or toxic fluoride salts, as in conventional methods of reducing rare earth metals from rare earth-containing materials. The methods described herein may facilitate reduction of rare earth metals at temperatures less than about 600° C., such as less than about 400° C., less than about 300° C., less than about 200° C., or even less than about 100° C. Further, the reducing agent of the methods described herein may be regenerated in the electrochemical cell 110, reducing chemical waste compared to conventional methods of reducing rare earth metals.

Example

A reaction solution comprising a rare earth-containing material comprising ionic neodymium, an ionic liquid comprising 1-n-butyl-1-methylpyrrolidinium bis(trifluoromethylsulfonyl)amide, and a reducing agent comprising lithium was prepared. The reaction solution was heated at about 100° C. for about 24 hours. The neodymium from the rare earth-containing material was reduced to form elemental neodymium.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of recovering an elemental rare earth metal, the method comprising:
    placing a rare earth-containing material comprising a rare earth metal in a reaction solution comprising a reducing agent and a non-aqueous solvent comprising an ionic liquid;
    reducing the rare earth metal with the reducing agent to form a metallic rare earth metal and cations of the reducing agent;
    transferring the cations of the reducing agent from the reaction solution to an electrochemical cell through an ion exchange membrane; and
    reducing the cations of the reducing agent in the electrochemical cell.

2. The method of claim 1, wherein placing a rare earth-containing material comprising a rare earth metal in a reaction solution comprises placing a rare earth-containing material in the reaction solution having a temperature less than about 300° C.

3. The method of claim 1, wherein placing a rare earth-containing material comprising a rare earth metal in a reaction solution comprising a reducing agent and a non-aqueous solvent comprising an ionic liquid comprises placing a rare earth-containing material in the reaction solution having temperature less than about 100° C.

4. The method of claim 1, wherein placing a rare earth-containing material comprising a rare earth metal in a reaction solution comprising a reducing agent and a non-aqueous solvent comprising an ionic liquid comprises placing a rare earth-containing material in a reaction solution comprising an ionic liquid comprising a eutectic mixture at a temperature greater than about 100° C.

5. The method of claim 1, further comprising adding, to the reaction solution, a compound formulated to facilitate transfer of electrons between the reducing agent and the rare earth-containing material.

6. The method of claim 1, wherein placing a rare earth-containing material comprising a rare earth metal in a reaction solution comprises placing, in the reaction solution, a rare earth-containing material comprising a rare earth metal-ligand complex selected from the group consisting of one or more of beta-diketones, carboxylic acids, tertiary amines, thiocarbomates, and organophosphates.

7. The method of claim 1, wherein placing a rare earth-containing material comprising a rare earth metal in a reaction solution comprises placing, in the reaction solution, a rare earth-containing material comprising one or more of a rare earth fluoride, a rare earth chloride, a rare earth nitrate, a rare earth triflate, a rare earth carbonate, and a rare earth bistriflimide.

8. The method of claim 1, wherein placing a rare earth-containing material comprising a rare earth metal in a reaction solution comprising a reducing agent and a non-aqueous solvent comprises placing the rare earth-containing material in the reaction solution comprising a reducing agent comprising a Group IA element or a Group IIA element.

9. The method of claim 1, wherein placing a rare earth-containing material comprising a rare earth metal in a reaction solution comprising a reducing agent and a non-aqueous solvent comprises placing the rare earth-containing material in the reaction solution comprising a reducing agent comprising one of lithium, sodium, potassium, calcium, magnesium, or lanthanum.

10. The method of claim 1, wherein placing a rare earth-containing material comprising a rare earth metal in a reaction solution comprising a reducing agent and a non-aqueous solvent comprises placing the rare earth-containing material in the reaction solution comprising an ionic liquid comprising one or more pyrrolidiniums selected from the group consisting of N-ethyl-N-methylpyrrolidinium, N-methyl-N-propylpyrrolidinium, N-methyl-N-isopropylpyrrolidinium, N-butyl-N-methylpyrrolidinium, N-isobutyl-N-methylpyrrolidinium, N-secbutyl-N-methylpyrrolidinium, N-methyl-N-pentylpyrrolidinium, N-hexyl-N-methylpyrrolidinium, N-heptyl-N-methylpyrrolidinium, N-methyl-N-octylpyrrolidinium, and 1-n-butyl-1-methylpyrrolidinium bis(trifluoromethylsulfonyl)amide.

11. The method of claim 1, wherein placing a rare earth-containing material comprising a rare earth metal in a reaction solution comprising a reducing agent and a non-aqueous solvent comprises placing the rare earth-containing material in the reaction solution comprising an ionic liquid comprising one or more of a piperidinium, a tetra alkyl ammonium, bis(trifluoromethanesulfonyl)imide, trifluoromethanesulfonate, dicyanimide, methyltributylammonium bis(trifluoromethylsulfonyl)imide, imidazolium chlorides (e.g., 1-ethyl-3-methylimidazolium chloride), tricaprylmethylammonium thiocyanate, and n-butylpyridinium chloride.

12. The method of claim 1, wherein placing a rare earth-containing material comprising a rare earth metal in a reaction solution comprising a reducing agent and a non-aqueous solvent comprises placing the rare earth-containing material in the reaction solution comprising an ionic liquid comprising one or more phosphoniums selected from the group consisting of trihexyl(tetradecyl)phosphonium, tetradecyl(trioctyl)phosphonium, triethyl-pentyl-phosphonium, triethyl-octyl-phosphonium, triethyl-dodecyl-phosphonium, trihexyl(tetradecyl)phosphonium dicyanamide, trihexyl(tetradecyl)phosphinium bis(trifluoromethylsulfonyl) amide, trihexyl(tetradecyl)phosphinium bis(2,4,4-trimethylpentyl phosphinate), trihexyl(tetradecyl)phosphinium bromide, trihexyl(tetradecyl)phosphinium chloride, and trihexyl(tetradecyl)phosphinium decanoate.

13. The method of claim 1, wherein placing a rare earth-containing material comprising a rare earth metal in a reaction solution comprising a reducing agent and a non-aqueous solvent comprises placing the rare earth-containing material in the reaction solution comprising a eutectic mixture selected from the group consisting of one or more of mixtures of choline bromide and xylitol, mixtures of choline and urea, and mixtures of choline chloride and lactic acid.

14. The method of claim 1, wherein placing a rare earth-containing material comprising a rare earth metal in a reaction solution comprising a reducing agent and a non-aqueous solvent comprises placing a rare earth-containing material comprising a rare earth oxide or a rare earth salt in the reaction solution.

15. The method of claim 1, wherein reducing the cations of the reducing agent in the electrochemical cell comprises reducing lithium in the electrochemical cell.

16. The method of claim 1, further comprising recycling, to the reaction solution, the reduced cations of the reducing agent.

17. The method of claim 1, wherein placing a rare earth-containing material comprising a rare earth metal in a reaction solution comprises placing the rare earth-containing material in a hydrophobic reaction solution.

18. The method of claim 1, further comprising adding a viscosity-reducing material to the reaction solution.

19. A method of forming an elemental rare earth metal, the method comprising:
   reducing a rare earth metal of a rare earth-containing material in a reaction chamber comprising a reaction solution including the rare earth-containing material, a reducing agent, and a non-aqueous solvent comprising an ionic liquid to form an elemental rare earth metal and cations of the reducing agent; and
   reducing the cations of the reducing agent to regenerate the reducing agent in an electrochemical cell isolated from the rare earth-containing material.

20. The method of claim 19, further comprising passing the cations of the reducing agent through a cation exchange membrane configured to selectively pass the cations of the reducing agent relative to other components of the reaction solution.

21. The method of claim 19, wherein reducing the cations of the reducing agent comprises reducing cations of lithium or cations of sodium.

22. The method of claim 19, further comprising recycling the regenerated reducing agent to the reaction chamber.

23. The method of claim 19, further comprising adding a viscosity-reducing material comprising a gas or a molecular solvent to the reaction solution.

24. The method of claim 19, further comprising adding a viscosity-reducing material and an electron transfer mediator to the reaction solution.

25. The method of claim 19, wherein reducing a rare earth metal of a rare earth-containing material in a reaction chamber comprising a reaction solution including the rare earth-containing material, a reducing agent, and a non-aqueous solvent comprising an ionic liquid comprises providing the rare earth-containing material to the reaction solution such that the rare earth-containing material constitutes from about 0.5 weight percent to about 50.0 weight percent of the reaction solution.

26. The method of claim 19, wherein reducing a rare earth metal of a rare earth-containing material in a reaction chamber comprising a reaction solution including the rare earth-containing material, a reducing agent, and a non-aqueous solvent comprising an ionic liquid comprises providing the reducing agent to the reaction solution such that the reducing agent constitutes from about 0.02 weight percent to about 50.0 weight percent of the reaction solution.

27. The method of claim 19, further comprising providing, to the reaction solution, an electron transfer mediator comprising one or more of a 7,7,8,8-tetracyanoquinodimethane containing-compound, lithium tetrakis(pentafluorophenyl) borate, decamethylruthenocene, tetrabutylammonium, bis(triphenylephosphoranylidene) ammonium chloride, bis(triphenylephosphoranylidene) ammonium tetrakis (pentafluorophenyl) borate, graphene oxide, a hydroxyl radical, a carbon radical, 1-butyl-3-methylimidazolium tetrafluoroborate, a divalent lanthanide derivative, rhodium ions, lithium metal, calcium metal, and sodium metal.

28. The method of claim 19, wherein reducing a rare earth metal of a rare earth-containing material in a reaction chamber comprising a reaction solution including the rare earth-containing material, a reducing agent, and a non-aqueous solvent comprising an ionic liquid comprises providing an ionic liquid comprising a binary mixture, a ternary mixture, or a multinary mixture of ionic liquids to the reaction solution.

* * * * *

UNITED STATES PATENT AND TRADEMARK OFFICE
CERTIFICATE OF CORRECTION

PATENT NO. : 11,788,171 B2
APPLICATION NO. : 17/249283
DATED : October 17, 2023
INVENTOR(S) : Mary E. Case, Robert V. Fox and Donna L. Baek It is certified that error appears in the above-identified patent and that said Letters Patent is hereby corrected as shown below:

In the Specification

| | | |
|---|---|---|
| Column 6, | Line 60, | change "(3-diketones." to --β-diketones.-- |
| Column 9, | Line 3, | change "2-butanone ($C_4H_5O$)," to --2-butanone ($C_4H_8O$),-- |
| Column 9, | Line 9, | change "($C_8H_{19}O$), dibutyl" to --($C_8H_{18}O$), dibutyl-- |
| Column 9, | Line 26, | change "nonane ($C_9H_2O$)," to --nonane ($C_9H_{20}$),-- |

Signed and Sealed this
Second Day of January, 2024

Katherine Kelly Vidal
*Director of the United States Patent and Trademark Office*